United States Patent
Li et al.

(10) Patent No.: US 12,212,374 B2
(45) Date of Patent: Jan. 28, 2025

(54) RADIO FREQUENCY BRANCH CALIBRATION OF A RADIO TRANSCEIVER DEVICE

(71) Applicant: Telefonaktiebolaget LM Ericsson (publ), Stockholm (SE)

(72) Inventors: Ming Li, Stockholm (SE); Huaisong Zhu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 369 days.

(21) Appl. No.: 17/774,944

(22) PCT Filed: Nov. 8, 2019

(86) PCT No.: PCT/SE2019/051134
§ 371 (c)(1),
(2) Date: May 6, 2022

(87) PCT Pub. No.: WO2021/091443
PCT Pub. Date: May 14, 2021

(65) Prior Publication Data
US 2022/0399943 A1    Dec. 15, 2022

(51) Int. Cl.
*H04B 17/12* (2015.01)
*H04L 5/00* (2006.01)
(Continued)

(52) U.S. Cl.
CPC ........... *H04B 17/12* (2015.01); *H04L 5/0005* (2013.01); *H04W 72/121* (2013.01); *H04W 72/23* (2023.01)

(58) Field of Classification Search
CPC .... H04B 17/12; H04W 72/23; H04W 72/121; H04L 5/0005
See application file for complete search history.

(56) References Cited

U.S. PATENT DOCUMENTS

| 2014/0092760 A1 | 4/2014 | Geirhofer et al. |
| 2017/0077613 A1* | 3/2017 | Banu .................. H04B 1/18 |

(Continued)

FOREIGN PATENT DOCUMENTS

| EP | 3282595 A1 | 2/2018 |
| WO | 2009067072 A1 | 5/2009 |

(Continued)

OTHER PUBLICATIONS

International Search Report dated Oct. 15, 2020 for International Application No. PCT/SE2019/051134 filed Nov. 8, 2019, consisting of 12 pages.

(Continued)

*Primary Examiner* — Duc C Ho
(74) *Attorney, Agent, or Firm* — Weisberg I.P. Law, P.A.

(57) ABSTRACT

Mechanisms for calibrating radio frequency branches of a radio transceiver device in a radio access network node. The method includes co-scheduling downlink time/frequency resources for terminal devices in accordance with a set of terminal device identifiers. One of the terminal device identifiers is not of any terminal device served by the radio access network node. The downlink time/frequency resources for this terminal device identifier define time/frequency resources for calibrating the radio frequency branches. The method includes determining a difference in amplitude/phase between the radio frequency branches by analysing a signal as received via an internal coupler unit in the radio transceiver device. The signal represents the time/frequency resources as transmitted over at least some of the radio frequency branches. The method includes calibrating the radio frequency branches by adjusting an amplitude/phase setting of at least one of the radio frequency branches according to the determined difference.

20 Claims, 6 Drawing Sheets

(51) Int. Cl.
*H04W 72/121* (2023.01)
*H04W 72/23* (2023.01)

(56) References Cited

U.S. PATENT DOCUMENTS

2019/0173443 A1  6/2019  Elwailly et al.
2019/0199454 A1  6/2019  Komatsuzaki et al.

FOREIGN PATENT DOCUMENTS

| WO | WO-2017001013 A1 | * | 1/2017 | ............ H01Q 1/243 |
| WO | 2018112829 A1 | | 6/2018 | |
| WO | 2018174811 A1 | | 9/2018 | |
| WO | 2019190371 A1 | | 10/2019 | |
| WO | WO-2019194709 A1 | * | 10/2019 | ............ H01Q 1/246 |

OTHER PUBLICATIONS

3GPP TSG RAN WG1 Meeting #96 R1-1901568; Title: Enhancements on multi-beam operation; Agenda Item: 7.2.8.3; Source: Huawei, HiSilicon; Document for: Discussion and Decision; Location and Date: Athens, Greece, Feb. 25-Mar. 1, 2019, consisting of 10 pages.

Xiliang Luo; Online Compressive Diagnosis of Massive MIMO Calibration State; Journal of Communications and Networks, vol. 19, No. 6; pp. 666-677, Dec. 2017, consisting of 12 pages.

European Search Report dated Jun. 28, 2023 for Application No. 19952103.0, consisting of 7 pages.

\* cited by examiner

RADIO FREQUENCY BRANCH CALIBRATION OF A RADIO TRANSCEIVER DEVICE

CROSS-REFERENCE TO RELATED APPLICATION

This application is a Submission Under 35 U.S.C. § 371 for U.S. National Stage Patent Application of International Application Number: PCT/SE2019/051134, filed Nov. 8, 2019 entitled "RADIO FREQUENCY BRANCH CALIBRATION OF A RADIO TRANSCEIVER DEVICE," the entirety of which is incorporated herein by reference.

TECHNICAL FIELD

Embodiments presented herein relate to a method, a network node, a computer program, and a computer program product for calibrating radio frequency branches of a radio transceiver device in a radio access network node.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is beamforming. In general terms, beamforming requires that the radio paths of the radio access network node, and other entities having radio frequency equipment, are convergent, i.e. have the same phase and amplitude response. In order to ensure this, each radio path should be calibrated with respect to the other radio paths in terms of phase and amplitude. The difference in phase and amplitude response between different radio paths might be temperature dependent and/or change over time. This could make continuous calibration of the transmitter and receiver paths of the radio access network node, and other entities having radio frequency equipment, necessary.

Antenna calibration is traditionally used to measure the amplitude and phase difference between each radio path in multi-antenna radio system and can thereby be used to optimize beamforming or spatial multiplexing performance of the multi-antenna radio system. Procedures for achieving antenna calibration traditionally involve several parts: measurement and calculation of relative transfer function between the radio frequency branches of the radio frequency equipment, calculation of compensation coefficients, and application of the compensation coefficients to implement the compensation and thus to complete the antenna calibration procedure.

For internal antenna calibration, a calibration signal is generated and transmitted. The calibration signal is received via an internal coupler in the radio frequency equipment. Signals as transmitted over different ones of the radio frequency branches are then compared so as to enable collection of measurements and calculation of the relative transfer function between the radio frequency branches. Auxiliary hardware or hardware already existing in the radio frequency equipment could be used for the generation and transmission of the calibration signal as well as for the reception of the calibration signal.

For time division duplex (TDD) system, the antenna calibration signal should be executed in downlink traffic time period to avoid regulation-not-allowed emission from the antenna calibration signal to be generated in the guard period. This means that when antenna calibration is active, transmission of normal traffic data will be interrupted. The same holds also for frequency division (FDD) systems but then for guard periods in the frequency domain.

From a time/frequency resources utilization point view, transmission of the antenna calibration signal causes resource overhead. With increasing number of radio frequency branches in the radio frequency equipment, more time/frequency resources need to be allocated for transmission of the antenna calibration signal. Further, from a scheduling point of view, it could be cumbersome to schedule the time/frequency resources need to be allocated for transmission of the antenna calibration signal in available physical resource blocks.

Hence, there is still a need for improved calibration procedures for radio access network nodes and other radio frequency equipment.

SUMMARY

An object of embodiments herein is to provide efficient calibration of radio access network nodes and other radio frequency equipment, not suffering from the issues noted above, or at least where the issues noted above are mitigated or reduced.

According to a first aspect there is presented a method for calibrating radio frequency branches of a radio transceiver device in a radio access network node. The method is performed by a network node. The method comprises co-scheduling downlink time/frequency resources for terminal devices in accordance with a set of terminal device identifiers. One of the terminal device identifiers is not of any terminal device served by the radio access network node. The downlink time/frequency resources for this terminal device identifier define time/frequency resources for calibrating the radio frequency branches. The method comprises determining a difference in amplitude/phase between the radio frequency branches by analysing a signal as received via an internal coupler unit in the radio transceiver device. The signal represents the time/frequency resources as transmitted over at least some of the radio frequency branches. The method comprises calibrating the radio frequency branches by adjusting an amplitude/phase setting of at least one of the radio frequency branches according to the determined difference.

According to a second aspect there is presented a network node for calibrating radio frequency branches of a radio transceiver device in a radio access network node. The network node comprises processing circuitry. The processing circuitry is configured to cause the network node to co-schedule downlink time/frequency resources for terminal devices in accordance with a set of terminal device identifiers. One of the terminal device identifiers is not of any terminal device served by the radio access network node. The downlink time/frequency resources for this terminal device identifier define time/frequency resources for calibrating the radio frequency branches. The processing circuitry is configured to cause the network node to determine a difference in amplitude/phase between the radio frequency branches by analysing a signal as received via an internal coupler unit in the radio transceiver device. The signal represents the time/frequency resources as transmitted over at least some of the radio frequency branches. The processing circuitry is configured to cause the network node to calibrate the radio frequency branches by adjusting an amplitude/phase setting of at least one of the radio frequency branches according to the determined difference.

According to a third aspect there is presented a network node for calibrating radio frequency branches of a radio transceiver device in a radio access network node. The network node comprises a schedule module configured to co-schedule downlink time/frequency resources for terminal devices in accordance with a set of terminal device identifiers. One of the terminal device identifiers is not of any terminal device served by the radio access network node. The downlink time/frequency resources for this terminal device identifier define time/frequency resources for calibrating the radio frequency branches. The network node comprises a determine module configured to determine a difference in amplitude/phase between the radio frequency branches by analysing a signal as received via an internal coupler unit in the radio transceiver device. The signal represents the time/frequency resources as transmitted over at least some of the radio frequency branches. The network node comprises a calibrate module configured to calibrate the radio frequency branches by adjusting an amplitude/phase setting of at least one of the radio frequency branches according to the determined difference.

According to a fourth aspect there is presented a computer program for calibrating radio frequency branches of a radio transceiver device in a radio access network node, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient calibration of radio access network nodes and other radio frequency equipment.

Advantageously, the calibration provided by these aspects does not suffer from the issues noted above.

Advantageously, the calibration provided by these aspects enable efficient utilization of air interface resources.

Advantageously, the calibration provided by these aspects is compatible with TDD regulation restrictions with respect to guard periods.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
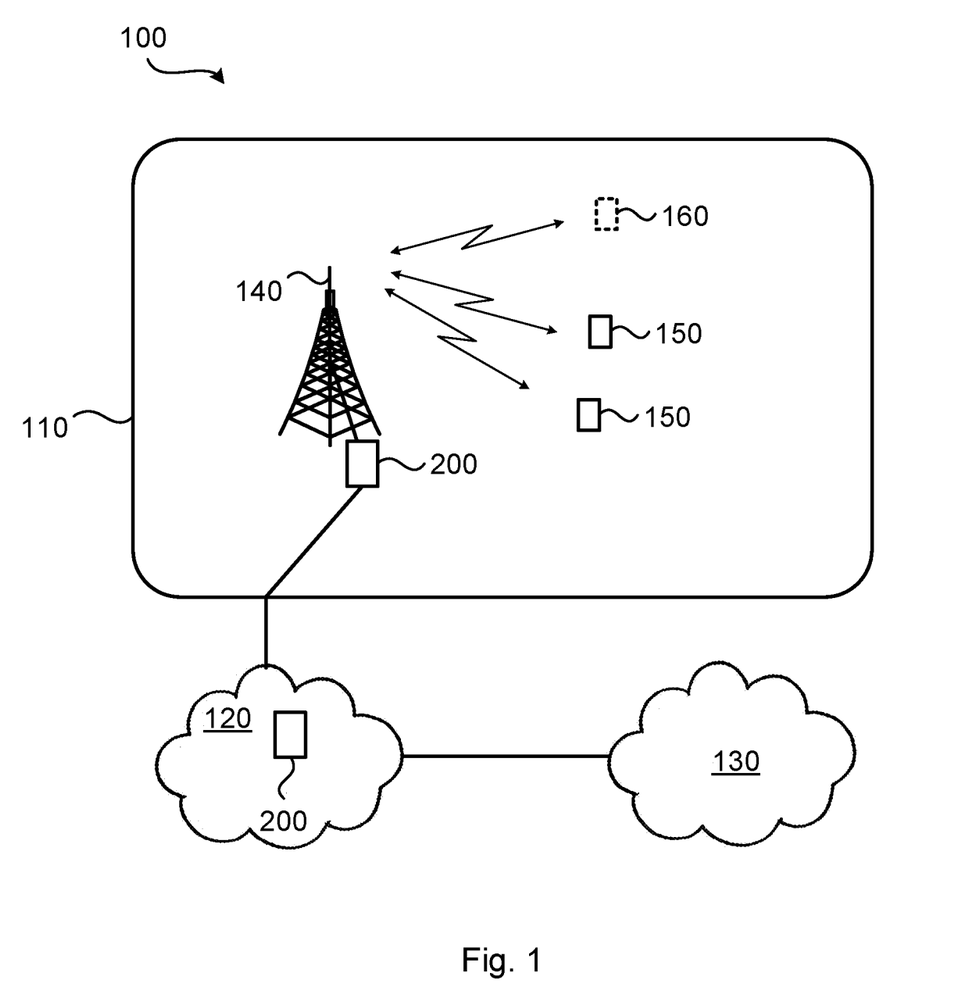
FIG. 1 is a schematic diagram illustrating a communications network according to embodiments.

FIG. 1 is a schematic diagram illustrating a communications network 100 where embodiments presented herein can be applied. The communications network 100 comprises a radio access network 110, a core network 120 and a service providing data network 130. In turn the radio access network 110 comprises a radio access network node 140. The radio access network node 140 is controlled by a network node 200. Further functionality of the network node 200 will be disclosed below. The radio access network node 140 is configured to, within its coverage region, or cell, provide network access to, and thus serve, terminal devices 15o. As will be further disclosed below, terminal device 160 represents a virtual terminal device which thus does not exists in reality.

Examples of radio access network nodes 140 include, but are not limited to, radio base stations, base transceiver stations; node Bs (NBs), evolved node Bs (eNBs), gNBs, access points, remote radio heads, and transmission and reception points. Examples of terminal devices 150 include, but are not limited to, portable wireless devices, mobile stations, mobile phones, handsets, wireless local loop phones, user equipment (UE), smartphones, laptop computers, tablet computers, wireless modems, network equipped sensors, and network equipped vehicles.

As disclosed above there is still a need for improved calibration procedures for radio access network nodes and other radio frequency equipment.

The embodiments disclosed herein therefore relate to mechanisms for calibrating radio frequency branches of a radio transceiver device in a radio access network node 140. In order to obtain such mechanisms there is provided a network node 200, a method performed by the network node 200, a computer program product comprising code, for example in the form of a computer program, that when run on a network node 200, causes the network node 200 to perform the method.

Figure 2:
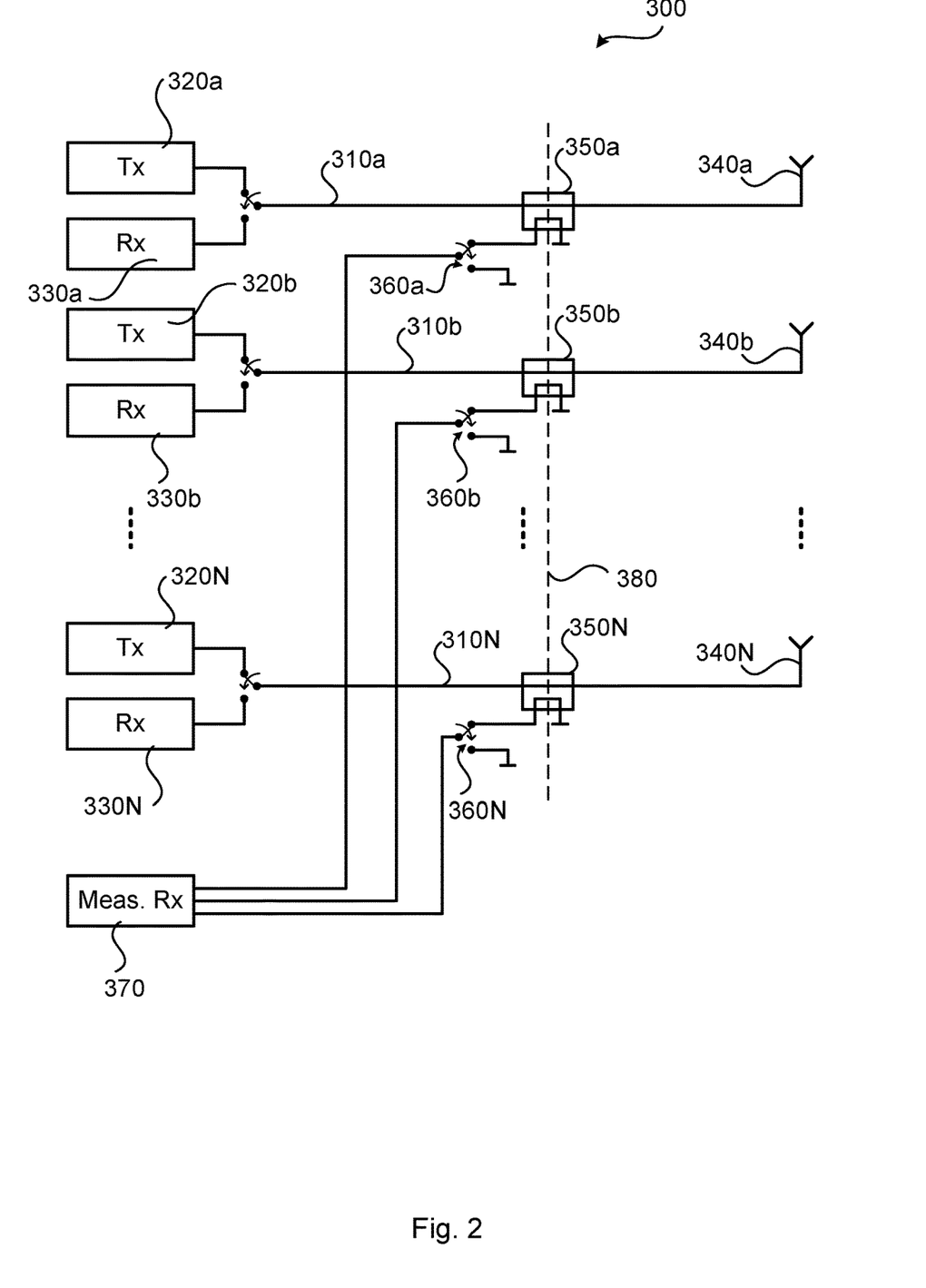
FIG. 2 schematically illustrates a radio unit according to an embodiment.

FIG. 2 schematically illustrates the radio transceiver device 300 of the radio access network nodes 140 according to an embodiment. The radio transceiver device 300 comprises N radio frequency branches 310a:310N. Each radio frequency branch extends between a respective pair of a transmitter 320a:320N and a receiver 330a:330N at one end and a respective antenna 340a:340N at the other end. Internal coupler unit 350a:350N are provided to, via switches 360a:360N, selectively couple signals as transmitted on the radio frequency branches 310a:310N to a measurement receiver 370. The internal coupling units 350a:350N are placed in the calibration plane 380 of the radio transceiver device 300.

Figure 3:
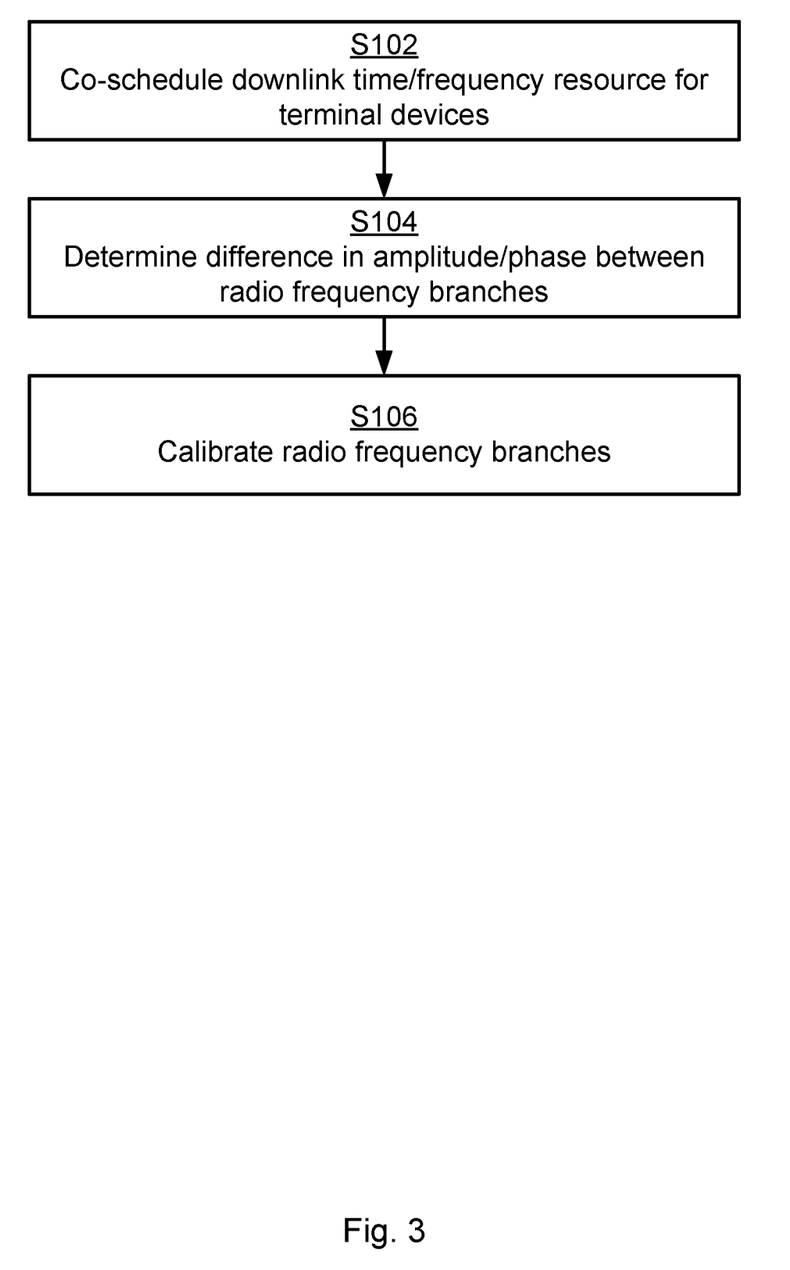
FIGS. 3 and 5 are flowcharts of methods according to embodiments.

FIG. 3 is a flowchart illustrating embodiments of methods for calibrating radio frequency branches 310a:310N of a radio transceiver device 300 in a radio access network node 140. The methods are performed by the network node 200. The methods are advantageously provided as computer programs 820.

S102: The network node 200 co-schedules downlink time/frequency resources for terminal devices 150, 160 in accordance with a set of terminal device identifiers. One of the terminal device identifiers is not of any terminal device 150 served by the radio access network node 140. The downlink time/frequency resources for this terminal device identifier define time/frequency resources for calibrating the radio frequency branches 310a:310N.

The terminal device identifier not being of any terminal device 150 served by the radio access network node 140 might thus be regarded as belonging to a virtual terminal device 160. In some aspects the network node 200 thus causes a virtual terminal device 160 to be co-scheduled with terminal devices 150 served by the radio access network node 140.

S104: The network node 200 determines a difference in amplitude/phase between the radio frequency branches 310a:310N. The difference is determined by analysing a signal as received via an internal coupler unit 350a:350N in the radio transceiver device 300. The signal represents the time/frequency resources as transmitted over at least some of the radio frequency branches 310a:310N.

The difference in amplitude/phase between the radio frequency branches 310a:310N is by the network node 200 used to calibrate the radio frequency branches 310a:310N as in action S106.

S106: The network node 200 calibrates the radio frequency branches 310a:310N. The radio frequency branches 310a:310N are calibrated by an amplitude/phase setting of at least one of the radio frequency branches 310a:310N being adjusted according to the determined difference.

Embodiments relating to further details of calibrating radio frequency branches 310a:310N of a radio transceiver device 300 in a radio access network node 140 as performed by the network node 200 will now be disclosed.

In some aspects, each of the terminal device identifiers is associated with a downlink precoder. The precoders might then be determined so that the signals as transmitted towards the terminal devices 150 served by the radio access network node 140 cause as small interference as possible to the downlink time/frequency resources for the terminal device identifier of the terminal device 160 not served by the radio access network node 140. According to an embodiment, a signal component of the signal as precoded with the downlink precoder of the terminal device identifier not being of a terminal device 150 served by the radio access network node 140 is orthogonal or uncorrelated to signal components of the signal as precoded with any of the other downlink precoders. Without loss of generality, assume that the radio access network node 140 serves two terminal devices 150 (hereinafter denoted UE 2 and UE 3) and one virtual terminal device 160 (hereinafter denoted UE 1). Assume further that the signal y the radio access network node 140 is configured to transmit on a specific subcarrier can be expressed as:

$$y = W_1 * S_1 + W_2 * S_2 + W_3 * S_3$$

Here, y is the frequency domain transmitted signal vector; $S_i$ is the signal for UE is the precoder of UE i, and "*" denotes vector multiplication. Denote by $r_1$ the signal received by UE 1. This signal can then be expressed as:

$$r_1 = H_1 y = H_1 * W_1 * S_1 + H_1 * W_2 * S_2 + * W_3 * S_3$$

Here, $H_1$ represents the propagation channel between the radio frequency branches 310a:310N and the measurement receiver 370 for receiving the calibration signal. For interference-minimized reception of $r_1$, the following should hold:

$$\|H_1 * W_2\| \approx 0 \text{ and } \|H_1 * W_3\| \approx 0$$

This implies that the measurement receiver 370 will receive only the signal component $S_1$ and will thus neither receive $S_2$ nor $S_3$. Thus:

$$r1 = H_1 y = H_1 * W_1 * S_1 + H_1 * W_2 * S_2 + * W_3 * S_3 \approx H_1 * W_1 * S_1$$

In other words, the signals for UE 2 and UE 3 will not interfere with the performance of the measurement receiver 370 for receiving the calibration signal.

There could be different ways for the downlink precoders to be determined in order to minimize the interference. According to an embodiment, the downlink precoders are determined using zero-forcing. As an example, $W_i$ can, based on zero-forcing, be found as follows:

$$W_1 = H_1^H (H_2^H H_2 + H_3^H H_3)^{-1}$$

$$W_2 = H_1^H (H_1^H H_1 + H_3^H H_3)^{-1}$$

$$W_3 = H_3^H (H_2^H H_2 + H_1^H H_1)^{-1}$$

The skilled person understands how to extend these expressions for more than three terminal devices.

In some aspects, the power according to which the time/frequency resources for calibrating the radio frequency branches 310a:310N is transmitted is flexibly adjusted to avoid impact to the downlink time/frequency resources for the terminal devices 150 served by the radio access network node 140. In particular, according to an embodiment, the time/frequency resources for calibrating the radio frequency branches 310a:310N are transmitted with lower transmit power than the downlink time/frequency resources for the terminal devices 150 served by the radio access network node 140.

In some aspects, the time/frequency resources for calibrating the radio frequency branches 310a:310N are inserted into less than all of the downlink radio frequency paths, and thus into less than all of the radio frequency branches 310a:310N. According to an embodiment, the time/frequency resources for calibrating the radio frequency branches 310a:310N are, per scheduling opportunity, thus transmitted over less than all the radio frequency branches 310a:310N. Thereby the transmission power for transmitting the time/frequency resources for calibrating the radio frequency branches 310a:310N will be lower than the transmission power for transmitting the time/frequency resources for the terminal devices 150 served by the radio access network node 140. In some non-limiting examples, the time/frequency resources for calibrating the radio frequency branches 310a:310N are inserted into only ½, or even only ¼, or even only ⅛, or even only 1/20, or even only 1/40 of all the radio frequency branches 310a:310N.

When the time/frequency resources for calibrating the radio frequency branches 310a:310N are, per scheduling opportunity, transmitted over less than all the radio frequency branches 310a:310N, then these time/frequency resources might over different scheduling opportunities be transmitted over different radio frequency branches 310a:310N such that these time/frequency resources collectively are transmitted over as many radio frequency branches 310a:310N as possibly. According to an embodiment, the time/frequency resources for calibrating the radio frequency branches 310a:310N in two neighbouring scheduling opportunities are transmitted over mutually different ones of the radio frequency branches 310a:310N. Thus, the time/frequency resources for calibrating the radio frequency branches 310a:310N might first be transmitted over some of the radio frequency branches 310a:310N and then over others of the radio frequency branches 310a:310N, etc. such that the time/frequency resources for calibrating the radio frequency branches 310a:310N eventually are collectively transmitted over all the radio frequency branches 310a:310N.

In some aspects, the time/frequency resources for calibrating the radio frequency branches 310a:310N have lower signal power density than the downlink time/frequency resources for the terminal devices 150 served by the radio access network node 140. According to an embodiment, the time/frequency resources for calibrating the radio frequency branches 310a:310N are thus transmitted with lower signal spectrum power density per radio frequency branch than the downlink time/frequency resources for the terminal devices 150 served by the radio access network node 140.

In general terms, downlink traffic signal energy will be accumulated at the receiver antenna of each terminal device 150 served by the radio access network node 140 with spatial domain precoding, while the calibration signal commonly is spread over the whole cell served by the radio access network node 140. In some examples the signal, when wirelessly transmitted from an antenna array, as defined by the antennas 340a:340N, as operatively connected to the radio frequency branches 310a:310N, is beamformed. Thereby, components of the signal comprising the time/frequency resources for calibrating the radio frequency branches 310a:310N are spatially separated from components of the signal comprising the time/frequency resources for the terminal devices 150 served by the radio access network node 140.

Figure 4:
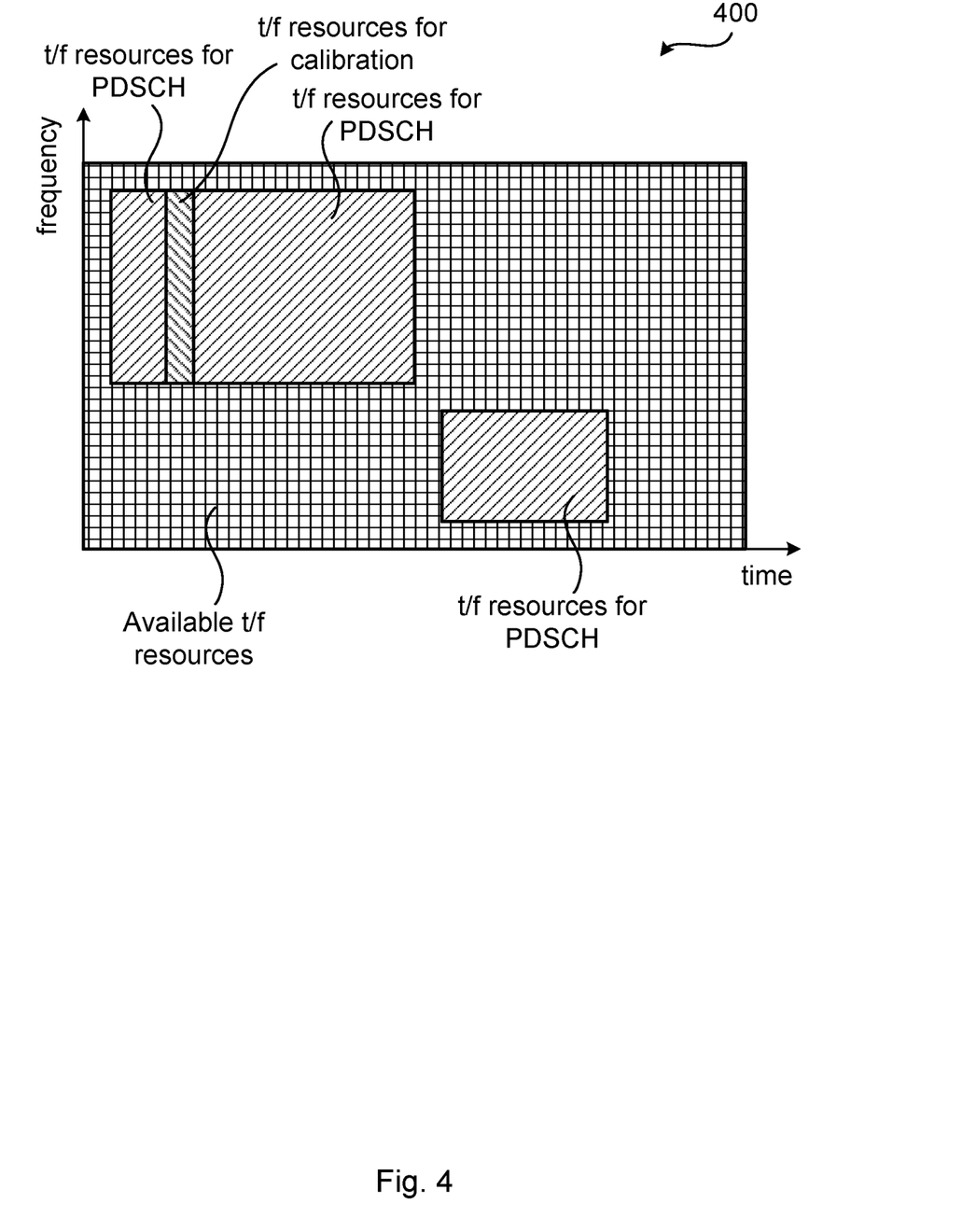
FIG. 4 schematically illustrates a time/frequency grid according to an embodiment.

There could be different time/frequency resources that are allocated for calibrating the radio frequency branches 310a:310N. In some examples, the time/frequency resources for calibrating the radio frequency branches 310a:310N are allocated for downlink transmission of data or control information. The time/frequency resources might thus be of physical resource blocks allocated for downlink data traffic or control information. In some examples, the time/frequency resources for calibrating the radio frequency branches 310a:310N are allocated for transmission in a physical downlink shared channel (PDSCH). The physical resource blocks might thus be part of PDSCH. Transmission of reference signals, such as channel state information reference signals (CSI-RS) and synchronization signal block (SSB) are thus not impacted by the transmission of the time/frequency resources that are allocated for calibrating the radio frequency branches 310a:310N. Reference is here made to FIG. 4. FIG. 4 schematically illustrates a time/frequency (t/f) grid 400 according to which time/frequency resources are allocated to physical resource blocks for downlink transmission from the radio access network node 140 towards its served terminal devices iso. In FIG. 4 is shown that the time/frequency resources for calibrating the radio frequency branches 310a:310N are allocated for transmission in PDSCH.

As disclosed above, the time/frequency resources for calibrating the radio frequency branches 310a:310N are inserted into less than all of the downlink radio frequency paths, and thus into less than all of the radio frequency branches 310a:310N. According to an embodiment, only these less than all the radio frequency branches 310a:310N are, via the switches 360a:360N coupled to the internal coupler units 350a:350N, coupled to the measurement receiver 370 for receiving the signal. This is illustrated in FIG. 2. It is then the signal as received by the measurement receiver 370 that is analysed in S104. Each radio frequency branch 310a:310N might thus be provided with a switch 360a:360N such that only the signal from those radio frequency branches 310a:310N in which the calibration signal is inserted is coupled to the measurement receiver 370. This might even further reduce the interference in the signal as received by the measurement receiver 370.

In some aspects, a set of signals is received. Each signal in the set of signals represents mutually different values of the time/frequency resources as transmitted over the at least some of the radio frequency branches 310a:310N. This allows for the network node 200 to in S104 iteratively determining the difference in amplitude/phase. According to an embodiment, an intermediate difference is determined for each set of signals, and the difference in amplitude/phase is determined as a mean of the intermediate differences in amplitude/phase.

In some aspects, the network node 200 will stop the calibrating of the radio frequency branches 310a:310N only when the results converge. According to an embodiment, signals are thus received, and intermediate differences are thus determined, until the difference in amplitude/phase has a statistical dispersion less than a threshold value.

Figure 5:
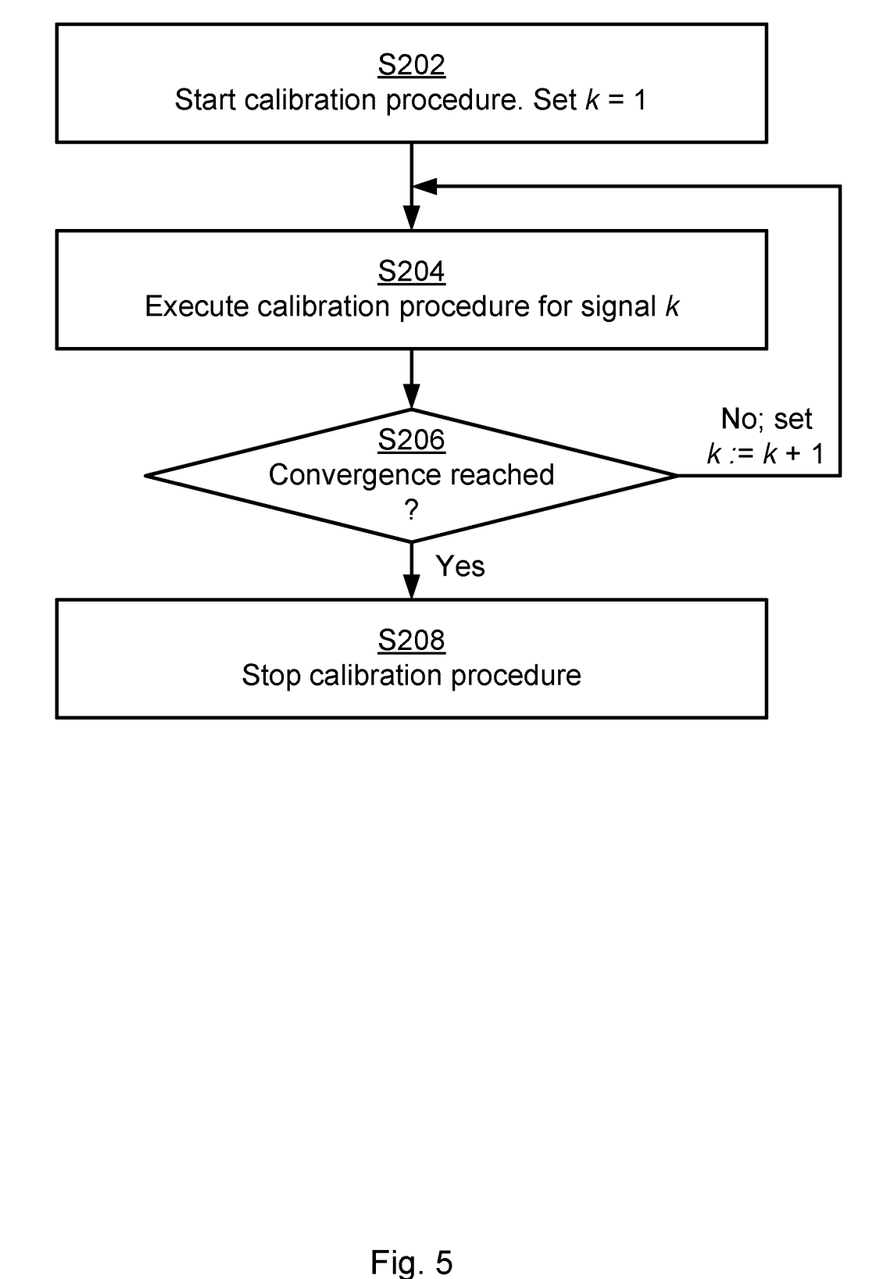

One particular embodiment for calibrating radio frequency branches 310a:310N of a radio transceiver device 300 in a radio access network node 140 as performed by the network node 200 will now be disclosed with reference to the flowchart of FIG. 5.

S202: The calibration procedure is started and k is set to have value 1, i.e., k=1.

S204: The calibration procedure is executed as in above disclosed actions S102, S104, S106 for the k:th signal, i.e., for signal k.

S206: It is checked if the difference in amplitude/phase between the radio frequency branches 310a:310N has converged from one iteration to the next, thus checking if the difference in amplitude/phase has a statistical dispersion less than a threshold value, and thus if convergence has been reached. If convergence has been reached, action S208 is entered. If convergence has not been reached, the value of k is increased, i.e., k: =k+1, and action S204 is entered again.

S208: The calibration procedure is stopped.

Figures 6, 7:
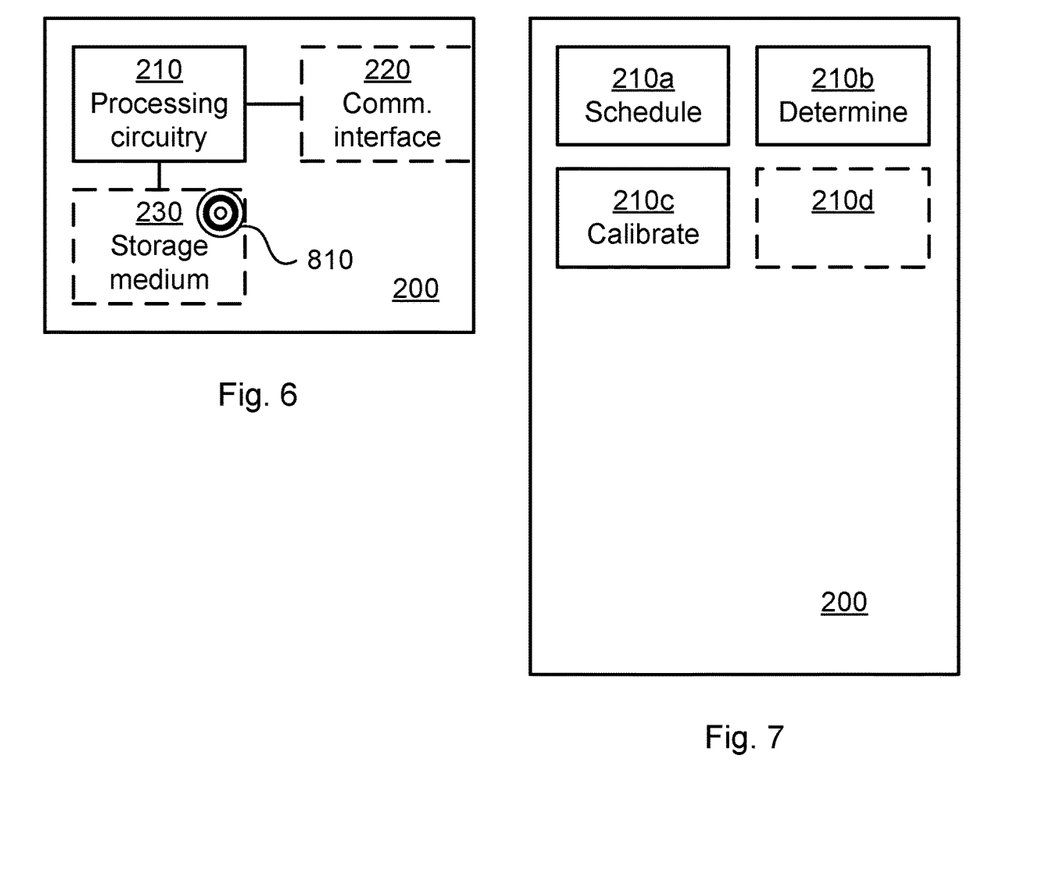
FIG. 6 is a schematic diagram showing functional units of a network node according to an embodiment.
FIG. 7 is a schematic diagram showing functional modules of a network node according to an embodiment.

FIG. 6 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or actions, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus, the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with the radio transceiver device 300 and the radio access network node 140 so that the network node 200 is enabled to control the radio access network node 140 to co-schedule the downlink time/frequency resources for the terminal devices 150, 160 in action S102, so that the network node 200 is enabled to receive the signals from the measurement receiver 370 in the radio transceiver device 300 for determining a difference in amplitude/phase between the radio frequency branches 310a: 310N in S104, and so that the network node 200 is enabled to calibrate the radio frequency branches 310a:310N as in S106. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

FIG. 7 schematically illustrates, in terms of a number of functional modules, the components of a network node 200 according to an embodiment. The network node 200 of FIG. 7 comprises a number of functional modules; a schedule module 210a configured to perform action S102, a determine module 210b configured to perform action S104, and a calibrate module 210C configured to perform action S106. The network node 200 of FIG. 7 may further comprise a number of optional functional modules, as represented by functional module 210d. In general terms, each functional module 210a-210d may in one embodiment be implemented only in hardware and in another embodiment with the help of software, i.e., the latter embodiment having computer program instructions stored on the storage medium 230 which when run on the processing circuitry makes the network node 200 perform the corresponding actions mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any actions as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

A first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 6 the processing circuitry 210 may be distributed among a plurality of devices, or nodes. The same applies to the functional modules 210a-210d of FIG. 7 and the computer program 820 of FIG. 8.

Figure 8:
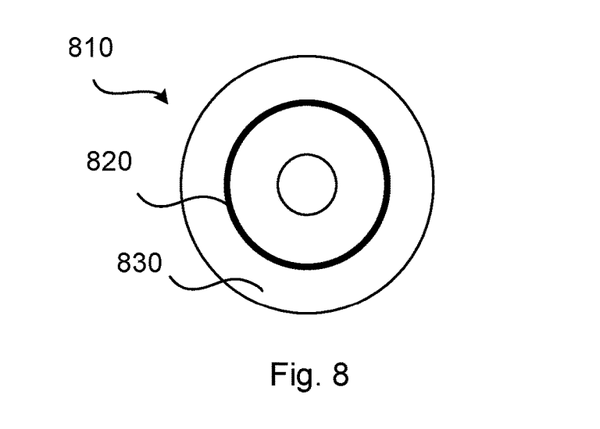
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any actions as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

As the skilled person understands, although embodiments have been disclosed for calibrating radio frequency branches 310a:310N of a radio transceiver device 300 in a radio access network node 140, the herein disclosed embodiments are equally applicable for also other types of radio frequency equipment, such as radio transceiver device 300 in terminal devices.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for calibrating radio frequency branches of a radio transceiver device in a radio access network node, the method being performed by a network node, the method comprising:
co-scheduling downlink time/frequency resources for terminal devices in accordance with a set of terminal device identifiers, one of the terminal device identifiers is not of any terminal device served by the radio access network node, and the downlink time/frequency resources for this terminal device identifier define time/frequency resources for calibrating the radio frequency branches;
determining a difference in amplitude/phase between the radio frequency branches by analysing a signal as received via an internal coupler unit in the radio transceiver device, the signal representing the time/frequency resources as transmitted over a plurality of the radio frequency branches; and
calibrating the radio frequency branches by adjusting an amplitude/phase setting of at least one of the radio frequency branches according to the determined difference.

2. The method according to claim 1, wherein each of the terminal device identifiers is associated with a downlink precoder, and wherein a signal component of the signal as precoded with the downlink precoder of the terminal device identifier not being of a terminal device served by the radio access network node is one of orthogonal and uncorrelated to signal components of the signal as precoded with any of the other downlink precoders.

3. The method according to claim 2, wherein the downlink precoders are determined using zero-forcing.

4. The method according to claim 1, wherein the time/frequency resources for calibrating the radio frequency branches are transmitted with lower transmit power than the downlink time/frequency resources for the terminal devices served by the radio access network node.

5. The method according to claim 1, wherein the time/frequency resources for calibrating the radio frequency branches are, per scheduling opportunity, transmitted over less than all the radio frequency branches.

6. The method according to claim 5, wherein the time/frequency resources for calibrating the radio frequency branches in two neighbouring scheduling opportunities are transmitted over mutually different ones of the radio frequency branches.

7. The method according to claim 5, wherein only the less than all the radio frequency branches are, via switches coupled to the internal coupler unit, coupled to a measurement receiver of the network node for receiving the signal, and wherein it is the signal as received by the measurement receiver that is analysed.

8. The method according to claim 1, wherein the time/frequency resources for calibrating the radio frequency branches are transmitted with lower signal spectrum power density per radio frequency branch than the downlink time/frequency resources for the terminal devices served by the radio access network node.

9. The method according to claim 1, wherein the signal, when wirelessly transmitted from an antenna array as operatively connected to the radio frequency branches, is beamformed whereby components of the signal comprising the time/frequency resources for calibrating the radio frequency branches are spatially separated from components of the signal comprising the time/frequency resources for the terminal devices served by the radio access network node.

10. The method according to claim 1, wherein the time/frequency resources for calibrating the radio frequency branches are allocated for downlink transmission of data or control information.

11. The method according to claim 1, wherein the time/frequency resources for calibrating the radio frequency branches are allocated for transmission in a physical downlink shared channel.

12. The method according to claim 1, wherein a set of signals is received, each signal of which representing mutually different values of the time/frequency resources as transmitted over the plurality of the radio frequency branches, wherein an intermediate difference is determined for each set of signals, and wherein the difference in amplitude/phase is determined as a mean of the intermediate differences in amplitude/phase.

13. The method according to claim 12, wherein signals are received, and intermediate differences are determined, until the difference in amplitude/phase has a statistical dispersion less than a threshold value.

14. A network node for calibrating radio frequency branches of a radio transceiver device in a radio access network node, the network node comprising processing circuitry, the processing circuitry being configured to cause the network node to:
co-schedule downlink time/frequency resources for terminal devices in accordance with a set of terminal device identifiers, one of the terminal device identifiers is not of any terminal device served by the radio access network node, and the downlink time/frequency resources for this terminal device identifier define time/frequency resources for calibrating the radio frequency branches;
determine a difference in amplitude/phase between the radio frequency branches by analysing a signal as received via an internal coupler unit in the radio transceiver device, the signal representing the time/frequency resources as transmitted over a plurality of the radio frequency branches; and
calibrate the radio frequency branches by adjusting an amplitude/phase setting of at least one of the radio frequency branches according to the determined difference.

15. The network node according to claim 14, wherein each of the terminal device identifiers is associated with a downlink precoder, and wherein a signal component of the signal as precoded with the downlink precoder of the terminal device identifier not being of a terminal device served by the radio access network node one of orthogonal and uncorrelated to signal components of the signal as precoded with any of the other downlink precoders.

16. The network node according to claim 14, wherein the downlink precoders are determined using zero-forcing.

17. The network node according to claim 14, wherein the time/frequency resources for calibrating the radio frequency branches are transmitted with lower transmit power than the downlink time/frequency resources for the terminal devices served by the radio access network node.

18. The network node according to claim 14, wherein the time/frequency resources for calibrating the radio frequency branches are, per scheduling opportunity, transmitted over less than all the radio frequency branches.

19. The network node according to claim 18, wherein the time/frequency resources for calibrating the radio frequency branches in two neighbouring scheduling opportunities are transmitted over mutually different ones of the radio frequency branches.

20. A non-transitory computer storage medium storing a computer program for calibrating radio frequency branches of a radio transceiver device in a radio access network node, the computer program comprising computer code which, when run on processing circuitry of a network node, causes the network node to:

co-schedule downlink time/frequency resources for terminal devices in accordance with a set of terminal device identifiers, one of the terminal device identifiers is not of any terminal device served by the radio access network node, and the downlink time/frequency resources for this terminal device identifier define time/frequency resources for calibrating the radio frequency branches;

determine a difference in amplitude/phase between the radio frequency branches by analysing a signal as received via an internal coupler unit in the radio transceiver device, the signal representing the time/frequency resources as transmitted over a plurality of the radio frequency branches; and calibrate the radio frequency branches by adjusting an amplitude/phase setting of at least one of the radio frequency branches according to the determined difference.

* * * * *